US012318954B2

(12) United States Patent
Bozikis

(10) Patent No.: US 12,318,954 B2
(45) Date of Patent: Jun. 3, 2025

(54) RAZOR CARTRIDGE

(71) Applicant: BIC VIOLEX S.A., Anoixi (GR)

(72) Inventor: Ioannis Bozikis, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 285 days.

(21) Appl. No.: 17/634,288

(22) PCT Filed: Sep. 4, 2020

(86) PCT No.: PCT/EP2020/074710
§ 371 (c)(1),
(2) Date: Feb. 10, 2022

(87) PCT Pub. No.: WO2021/058258
PCT Pub. Date: Apr. 1, 2021

(65) Prior Publication Data

US 2022/0324128 A1 Oct. 13, 2022

(30) Foreign Application Priority Data

Sep. 25, 2019 (EP) .................................... 19199652

(51) Int. Cl.
*B26B 21/40* (2006.01)
*A45D 27/24* (2006.01)
(Continued)

(52) U.S. Cl.
CPC .......... *B26B 21/4031* (2013.01); *A45D 27/24* (2013.01); *B26B 21/4068* (2013.01); *B26B 21/06* (2013.01); *B26B 21/227* (2013.01)

(58) Field of Classification Search
CPC . B26B 21/40; B26B 21/4006; B26B 21/4031; B26B 21/4068; B26B 21/06; B26B 21/22; B26B 21/227; B26B 21/4012
See application file for complete search history.

(56) References Cited

U.S. PATENT DOCUMENTS 6,035,537 A * 3/2000 Apprille, Jr. ........ B26B 21/4068 30/346.5
7,100,284 B2 * 9/2006 King .................... B26B 21/521 30/527
(Continued)

FOREIGN PATENT DOCUMENTS

CN 102046340 A 5/2011
CN 102802890 A 11/2012
(Continued)

OTHER PUBLICATIONS

International Search Report and Written Opinion in International Application No. PCT/EP2020/074710, mailed Nov. 4, 2020 (8 pages).
(Continued)

*Primary Examiner* — Adam J Eiseman
*Assistant Examiner* — Richard D Crosby, Jr.
(74) *Attorney, Agent, or Firm* — Bookoff McAndrews, PLLC

(57) ABSTRACT

A razor cartridge comprising a frame, wherein the frame comprises a leading longitudinal member and a trailing longitudinal member and at least one transverse frame member defining a cartridge plane, disposed in between, and joining, the leading longitudinal member and the trailing longitudinal member, in a transverse direction of the razor cartridge. The at least one transverse frame member comprises a plurality of cutting member guides defining a plurality of cutting member support slots, each cutting member support slot configured to accommodate a longitudinal cutting member, and a plurality of longitudinal cutting members, wherein each cutting member is disposed in a respective cutting member support slot.

18 Claims, 12 Drawing Sheets

(51) Int. Cl.
*B26B 21/06* (2006.01)
*B26B 21/22* (2006.01)

(56) References Cited

U.S. PATENT DOCUMENTS

| | | | | |
|---|---|---|---|---|
| 8,479,398 | B2 * | 7/2013 | Coresh | B26B 21/225 30/41 |
| 11,413,775 | B2 * | 8/2022 | Walker, Jr. | B26B 21/4018 |
| 2009/0293281 | A1 * | 12/2009 | Bruno | B26B 21/222 30/50 |
| 2011/0146079 | A1 * | 6/2011 | Clarke | B26B 21/222 30/34.05 |
| 2012/0151772 | A1 * | 6/2012 | Moon | B26B 21/225 30/41 |
| 2015/0090085 | A1 * | 4/2015 | Griffin | B26B 21/4018 83/13 |
| 2016/0279816 | A1 * | 9/2016 | Bruno | B26B 21/222 |
| 2016/0332313 | A1 * | 11/2016 | O'Connor | B26B 21/4018 |
| 2016/0361827 | A1 * | 12/2016 | Bruno | B26B 21/4012 |
| 2019/0202076 | A1 * | 7/2019 | Park | B26B 21/4025 |
| 2019/0299457 | A1 * | 10/2019 | Long | B26B 21/4012 |

FOREIGN PATENT DOCUMENTS

| | | | |
|---|---|---|---|
| EP | 2823941 | A1 | 1/2015 |
| EP | 3492227 | A1 | 6/2019 |
| KR | 20100091622 | A | 8/2010 |
| WO | 2006027018 | A1 | 3/2006 |
| WO | 2008002069 | A1 | 1/2008 |
| WO | 2009146230 | A1 | 12/2009 |
| WO | 2012/158141 | A1 | 11/2012 |
| WO | 2019190836 | A1 | 10/2019 |

OTHER PUBLICATIONS

First Search issued in corresponding application No. CN202080058903, mailed Apr. 12, 2023.

* cited by examiner

RAZOR CARTRIDGE

This application is a National Stage application of International Application No. PCT/EP2020/074710 filed on 4 Sep. 2020, now published as WO2021058258A1 and which claims benefit from European patent application EP19199652.9, filed on 25 Sep. 2019, the entire contents being incorporated herein by reference.

TECHNICAL FIELD

The aspects described in the following disclosure relate to a razor cartridge, a method for manufacturing a razor cartridge, a shaving razor assembly and an associated kit of parts.

BACKGROUND

Razor cartridges (also known as safety razor cartridges) are permanently or removably attached to a razor handle that, in use, is oriented in shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). In use, a user holds the razor handle in the shaving direction and brings the razor cartridge into contact with a portion of skin defining a shaving plane.

Typically, the shaving plane is defined as the tangential line intersecting the first and second skin contact points of, for example, cutting edges of the shaving head. More simply, the shaving plane may be approximated as a line between the highest points on the skin-contacting surfaced of a razor cartridge—for example, the flat plane between the top of a guard and the top of a cap of the shaving head. Movement of the razor handle causes the blades of the razor cartridge to be moved across the shaving plane in the shaving direction, enabling the blades to remove unwanted hair.

The performance of razor cartridges may be further improved.

SUMMARY

According to a first aspect, there is provided a razor cartridge comprising a frame. The frame comprises a leading longitudinal member and a trailing longitudinal member defining a cartridge plane, and at least one transverse frame member disposed in between, and joining, the leading longitudinal member and the trailing longitudinal member, in a transverse direction of the razor cartridge.

The at least one transverse frame member comprises a plurality of cutting member guides defining a plurality of cutting member support slots, each cutting member support slot configured to accommodate a longitudinal cutting member.

The razor cartridge further comprises a plurality of longitudinal cutting members, wherein each cutting member is disposed in a respective cutting member support slot. At least one cutting member guide comprises a first planar face proximate to a first cutting member support slot. The at least one cutting member guide further comprises an intermediate portion that is a greater distance away from the first cutting member support slot than the first planar face in the transverse direction of the razor cartridge.

A first longitudinal distance is defined by the width of the first planar face of the at least one cutting member guide in the cartridge plane, and a second longitudinal distance is defined by width of the intermediate portion of the first cutting member guide at the widest point of the first cutting member guide in the cartridge plane.

A ratio of the first longitudinal distance and the second longitudinal distance is in the range 0.1:0.8.

According to a second aspect, there is provided a method for manufacturing a razor cartridge. The method comprises:

a) providing a frame comprising a leading longitudinal member and a trailing longitudinal member and at least one transverse frame member defining a cartridge plane, disposed in between, and joining, the leading longitudinal member and the trailing longitudinal member in a transverse direction of the razor cartridge, wherein the at least one transverse frame member comprises a plurality of cutting member guides defining a plurality of cutting member support slots each configured to accommodate a longitudinal cutting member;

wherein at least one cutting member guide comprises a first planar face proximate to a first cutting member support slot, and wherein the at least one cutting member guide further comprises an intermediate portion that is a greater distance away from the first cutting member support slot than the first planar face in the transverse direction of the razor cartridge, and wherein a first longitudinal distance is defined by the width of the first planar face of the at least one cutting member guide in the cartridge plane, and a second longitudinal distance is defined by width of the intermediate portion of the first cutting member guide at the widest point of the first cutting member guide in the cartridge plane, wherein a ratio of the first longitudinal distance and the second longitudinal distance is in the range 0.1:0.8; and b) providing a plurality of cutting members, wherein each cutting member is disposed in a respective cutting member support slot of the at least one transverse frame member.

According to a third aspect, there is provided a shaving razor assembly comprising: a razor handle, and a razor cartridge according to the first aspect. The razor cartridge is either releasably attached to the razor handle, integrally formed with the razor handle via a non-pivotable connection, or integrally formed with the razor handle via a pivotable connection.

According to a fourth aspect, there is provided a kit of parts comprising a razor cartridge holder comprising a plurality of razor cartridges according to the first aspect.

An effect of the aspects discussed above is that the cutting members (blades) of a razor cartridge are supported by cutting member guides that are strengthened owing to their shape. In other words, the cutting member guides can better resist deflection when a force is applied to them by a cutting member support during shaving, for example. Undesired movement of the cutting members during shaving is therefore significantly reduced. The stability of the cutting member guides designed according to the technique discussed herein enables the provision of an open architecture shaver head that facilitates the rinsing and cleansing of debris from the shaver head during shaving.

Another effect of the aspects discussed above is that a production tool for producing razor cartridges according to aspects discussed herein is simpler, because cutting member guides having thin and sensitive areas are avoided. Cutting member guides comprising such thin and sensitive areas can result in lower production quality and difficulties with repeatability when manufactured with injection moulding systems, for example.

In the following specification, the term "cutting member" means a component of a razor cartridge that, in use, contacts the skin of a user and cuts protruding hairs. A cutting member can mean at least a razor blade having a blade with a cutting edge glued, or laser welded, to a separate bent support member. The bent support member is fitted into a cutting member support slot in-between two opposed cutting member guides, such as protrusions from a transverse frame member of the razor cartridge. The blade can be attached to the face of the bent support member that faces towards a user of the razor cartridge, in use. Alternatively, the blade can be attached to the face of the bent support member that faces away from a user of the razor cartridge, in use. In this latter case, each cutting member has two contact points with the skin of the user (the blade edge, and the distal end of the bent support member), to thus reduce pressure on the user's skin.

Alternatively, the cutting member may be a "bent blade". This is an integrally formed cutting member comprising a radiused bend, and a cutting edge formed at a distal end of the radiused bend.

A "group of cutting members" may consist of the same type of cutting members, or may comprise at least one bent blade, or another type of blade for example.

In the following specification, the term "cartridge plane" means a plane passing through the joint of one or more protuberances forming cutting member guides with a transverse frame member of the razor cartridge upon which the protuberances are formed. In other words, the cartridge plane is substantially parallel to a shaving plane of the razor cartridge, but the cartridge plane is further away from the shaving plane because it is aligned with the surface nearest to the shaving plane of the transverse frame members of a razor cartridge upon which the protuberances forming the cutting member supports are formed.

In the following specification, the term "leading" means the side of the razor cartridge that contacts a portion of a user's skin first, in normal use.

In the following specification, the term "trailing" means the side of the razor cartridge that contacts a portion of a user's skin last, in normal use.

Embodiments are discussed in the dependent claims and in the detailed description, to which the reader should now refer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
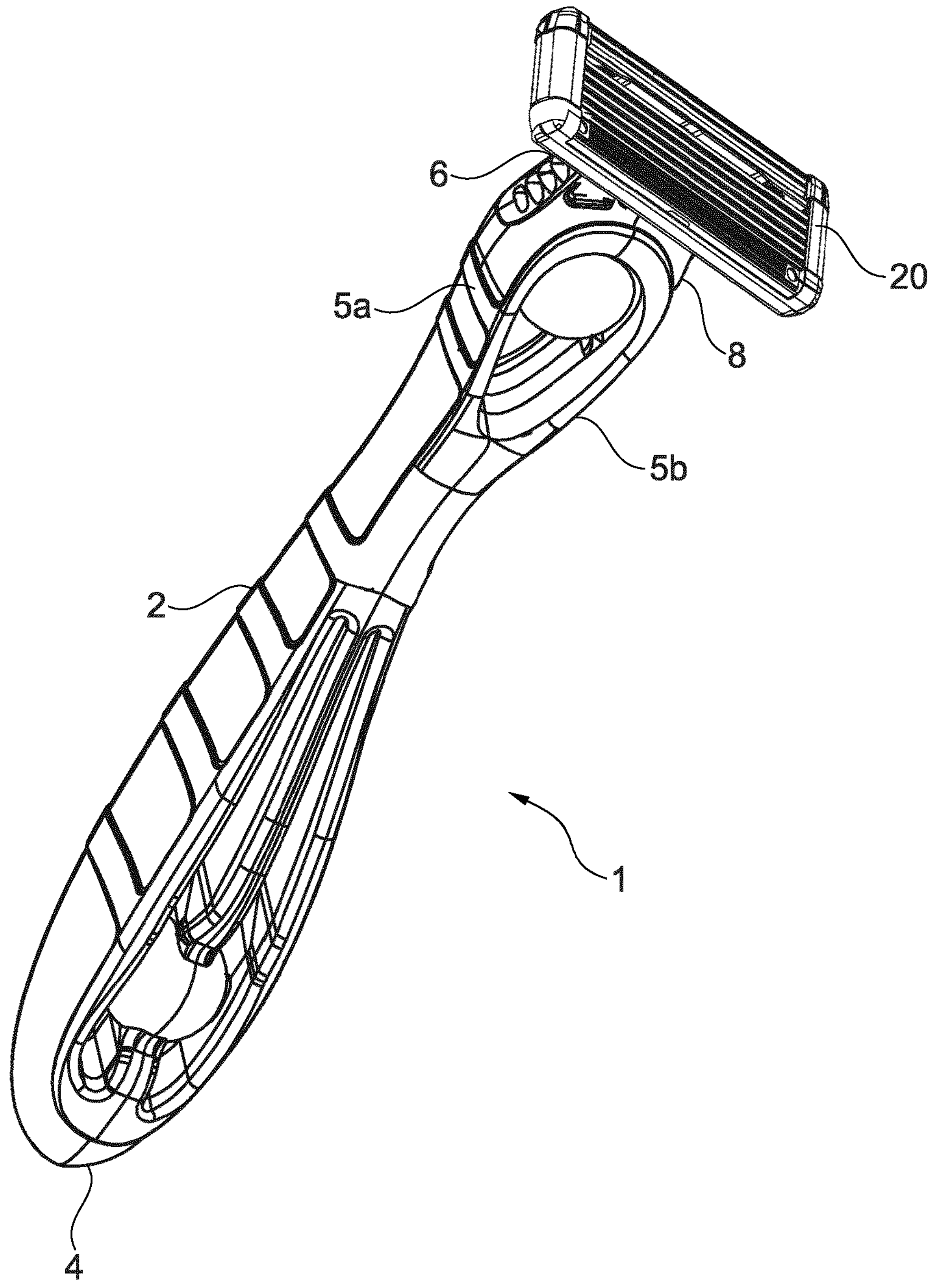
FIG. 1 is a perspective view of a shaving razor assembly.

FIG. 1 is a perspective view of a shaving razor assembly 1 according to an aspect. The shaving razor assembly comprises cutting members which are not driven by a motor. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be discussed in more detail following discussion of the shaving razor assembly 1.

The mounting of the razor cartridge 20 to the distal portion 6 of the handle 2 in the illustration is, in an embodiment, via a pivotable bearing member 8, enabling a frame of reference of the handle 2 to vary relative to a frame of reference of the razor cartridge 20. This enables the angle of the razor cartridge against the skin of a user to vary and adapt to changes during use.

In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Another example of a connection mechanism for connecting the razor cartridge 20 to the handle 2 is discussed in WO2006/027018 A1. Another example is a razor cartridge 20 that may pivot relative to a second pivot axis (a rocking axis), substantially perpendicular to axis L.

In examples, the pivotable bearing member 8 may be omitted (not illustrated) and the handle 2 provided as an integrally connected part of the support of the razor cartridge 20.

In an example, the pivotable bearing member 8 may further comprise, or be replaced by, a release mechanism 5*a*, 5*b*, enabling rapid release of an exhausted razor cartridge from the handle 2.

In an example, the handle 2 and the support of the razor cartridge 20 are integrally formed with a pivotable bearing member (not illustrated) such as a resilient plastic spring member.

In an example, the handle 2 is provided with a handle grip 9 formed of a rubber, or rubber-like material to improve gripping friction. In an example, the handle is provided with a thumb-rest 7 to enable a more secure grip of the handle 2 by a user.

Figure 2:
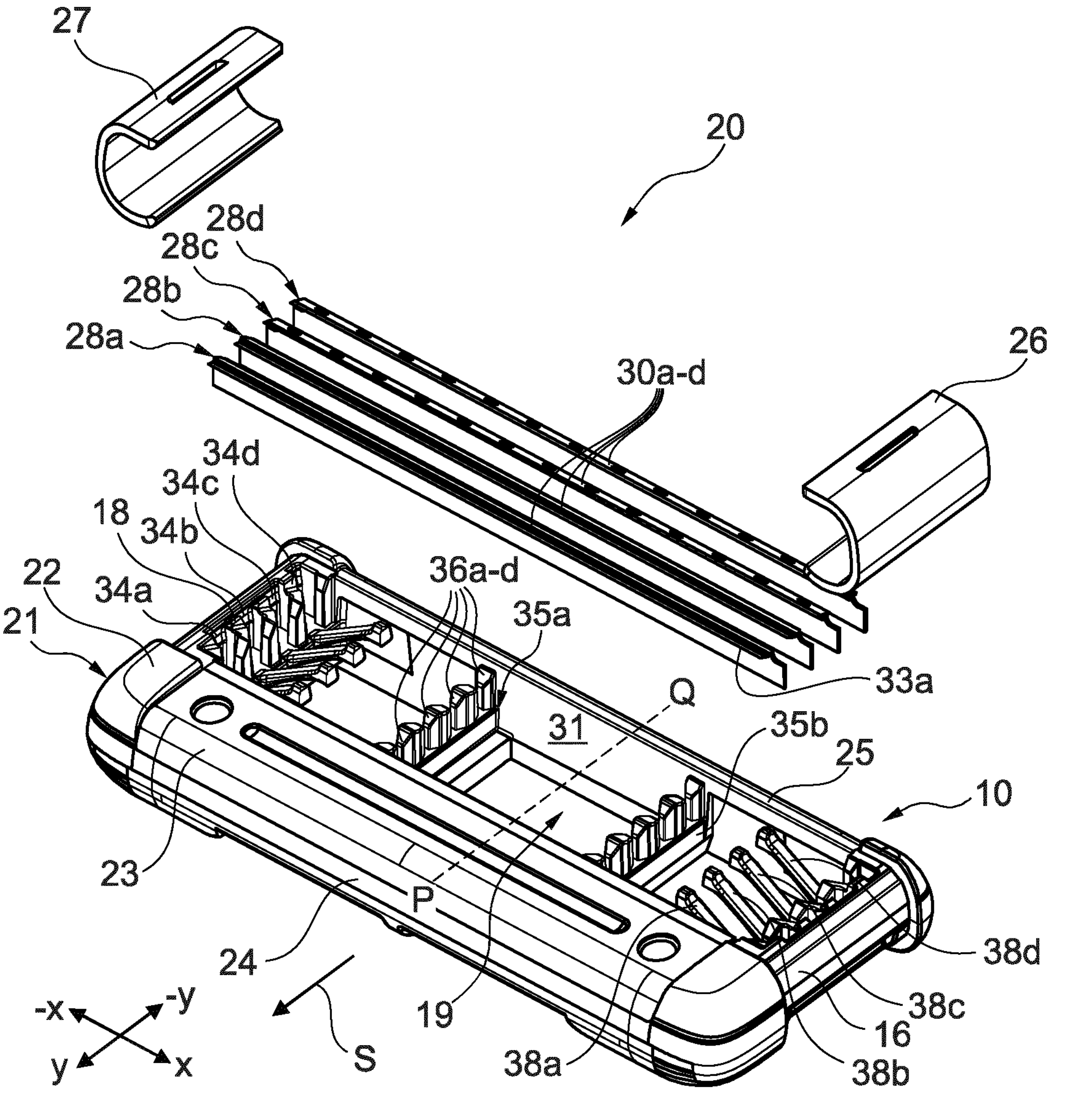
FIG. 2 is a perspective partial exploded view of a razor cartridge.

FIG. 2 is a perspective partial exploded view of a razor cartridge 20 according to an example of the first aspect. "Partial exploded view" means that some minor components of the razor cartridge 20 have been omitted from the exploded view to aid clarity of the drawing.

According to a first aspect, there is provided a razor cartridge 20 comprising a frame 21. The frame 21 comprises a leading longitudinal member 24 and a trailing longitudinal member 25 and at least one transverse frame member 35 defining a cartridge plane CP disposed in between, and joining, the leading longitudinal member 24 and the trailing longitudinal member 25, in a transverse direction of the razor cartridge 20.

The at least one transverse frame member 35 comprises a plurality of cutting member guides 36*a-d* defining a plurality of cutting member support slots, each cutting member support slot configured to accommodate a longitudinal cutting member.

The razor cartridge 20 further comprises a plurality of cutting members 28*a-d*, wherein each cutting member 28*a-d* is disposed in a respective cutting member support slot. At least one cutting member guide 36*a-d* comprises a first planar face proximate to a first cutting member support slot. The cutting member guide further comprises an intermediate portion that is a greater distance away from the first cutting member support slot than the first planar face in the transverse direction of the razor cartridge 20.

A first longitudinal distance d1 is defined by the width of the first planar face 50 of the at least one cutting member guide 36*a* in the cartridge plane CP, and a second longitudinal distance d2 is defined by the width of the intermediate portion 53*b* of the first cutting member guide 36*a* at the widest point of the first cutting member guide in the cartridge plane CP.

A ratio of the first longitudinal distance d1 and the second longitudinal distance d2 is in the range 0.1:0.8.

The shaving direction S is depicted in FIG. 2 using arrow S. In use, the razor cartridge 20 contacts a shaving plane SH (not shown in FIG. 4), and is translated by the user across the shaving plane SH in the direction of arrow S.

A frame 21 may be fabricated partially or completely of synthetic materials, such as plastic, resin, or elastomers. The frame 21 comprises a platform member 22 connectable to a handle 2 of a shaving razor assembly 1 either integrally, or by a connection mechanism such as a pivotable bearing member 8*a* or by an interconnecting member (not shown).

In an example, a guard member 23 is, in an example, provided as a substantially longitudinal edge of the razor cartridge 20. In use, the guard member 23 is the first portion of the razor cartridge 20 to contact uncut hairs, and it is thus located at a leading longitudinal member 24 of the razor cartridge 20. The side of the razor cartridge 20 opposite to the leading longitudinal member 24 of the razor cartridge 20 and opposite to the shaving direction is the trailing longitudinal member 25 of the razor cartridge 20. The trailing longitudinal member 25 is thus the final portion of the razor cartridge 20 to contact the shaving plane SH, in use.

It will be noted that the terms "leading longitudinal member 24" and "trailing longitudinal member 25" are used to denote specific locations on the razor cartridge 20, and do not imply or require the absence or presence of a particular feature. For example, a guard member 23 may in one example be located at the side comprising the "leading longitudinal member 24", and in another example a trimming blade (not shown in FIG. 4) may be located at the side comprising the "trailing longitudinal member 25" in another example, but it is not essential that these sides of the razor cartridge 20 comprise such features.

The guard member 23, in an example, comprises an elastomeric member (not shown in FIG. 2). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The razor cartridge 20 may, in embodiments, further comprise a cap member (not shown in FIG. 2) at, or near to, the trailing longitudinal side 25 but this is not illustrated in the embodiment of FIG. 2 as an aid to clarity.

The razor cartridge 20 further comprises a group of cutting members 28*a-d* accommodated in a cutting member receiving section 31 of the frame 21. The group of cutting members 28*a-d* comprises a plurality of longitudinal cutting members 28*a-d*. In embodiments, each of the longitudinal cutting members 28*a-d* comprises a blade 33*a-d* having a cutting edge 30*a-d*. The group of cutting members 28*a-d* is disposed in the frame 21 longitudinally and transverse to the shaving direction S such that in use, the blades 33*a-d* of the cutting members 28*a-d* contact a shaving plane SH and cut hair present on the shaving plane SH as the razor cartridge 20 is moved across the shaving plane SH in the shaving direction S. The particular design of the cutting members 28*a-d* of the group of cutting members 28*a-d* will be discussed subsequently.

In an example, a razor cartridge 20 is provided with three cutting members. In an example, a razor cartridge is provided with four cutting members. In an example, a razor cartridge is provided with five cutting members. In an example, a razor cartridge is provided with six cutting members. In an example, a razor cartridge is provided with seven or more cutting members.

The group of cutting members 28*a-d* defines a plurality of substantially parallel inter-blade spans 40, 41, 42. In conventional razor cartridges having blades above the support, with three or more blades, each inter-blade span is measured to be constant in a range of about 1.05 mm to 1.5 mm.

The number of inter-blade spans 40, 41, 42 is one fewer than the number of cutting members. The frame 21 further comprises first retainer 26 and second retainer 27 configured to hold the cutting members 28*a-d* within razor cartridge 20 housing. The frame 21 further comprises first 16 and second 18 side portions. When the razor cartridge 20 is assembled, the first and second side portions 16, 18 are configured to confine the longitudinal ends of the guard member 23, a cap member (if present, not shown in FIG. 2) and the group of cutting members 28*a-d*. The first side retainer 26 and second retainer 27 may comprise, for example, plastic, an elastomer, or a metal material and furthermore may be of a different shape to that illustrated.

Although not illustrated, a pivotable bearing member 8 may, in an example, be provided on the side of the razor cartridge 20 configured to connect to a pivotable handle 2. Such a pivotable bearing member 8, in an example, comprises two or more shell bearings configured to connect to the pivotable bearing member 8*a* of the handle 2.

In an example, the cutting members 28*a-d* comprised in the group of cutting members 28*a-d* are disposed in the razor cartridge 20 such that two cutting edges 30*a,b* comprised, respectively, on the two foremost (nearest to the leading longitudinal member 24 of the razor cartridge 20) cutting members 28*a,b* of the group of cutting members 28*a-d* define a leading inter-blade span that is closest to the leading longitudinal side 24 of the razor cartridge 20 and that is greater than a trailing inter-blade span defined between the two cutting edges that are closest to the trailing longitudinal side 25 of the razor cartridge. An embodiment of a razor cartridge 20 having a variable inter blade span is illustrated further in FIGS. 9 and 10 and discussed subsequently.

The razor cartridge 20 of FIG. 2 comprises four resilient fingers 38*a*, 38*b*, 38*c*, 38*d* under the first retainer 26. The razor cartridge 20 comprises four resilient fingers under the second retainer 27 that are in transverse corresponding alignment with the four resilient fingers 38*a*, 38*b*, 38*c*, 38*d* under the first retainer 26.

In total, the eight resilient fingers each exert a bias force against respective cutting members 28*a-d* of the group of cutting members 28*a-d* in the direction of the shaving plane SH, such that the cutting members 28*a-d* of the group of cutting members 28*a-d* are in a rest position, when the razor cartridge 20 is assembled. In the rest position, the cutting edges 30 of the blades 33 of the cutting members 28*a-d*, bear against corresponding stop portions at each lateral end of the blades 33 near the first 26 and second 27 retainers, for example. In an example, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the transverse frame members 35. In a simplified razor cartridge design (such as for low cost, disposable razors), the resilient fingers may be omitted. A skilled person will appreciate that the number of resilient fingers 38 to be provided is related to the number of cutting members 28*a-d* in the group of cutting members 28*a-d*, and that fewer or more than eight resilient fingers 38 can be provided.

In an example, each cutting member 28*a-d* in the group of cutting members 28*a-d* comprise a longitudinal blade support 32. A longitudinal blade 33 is mounted on the blade support 32. The cutting edge 30 of a blade 28*a-d* is oriented forward in the direction of shaving S. The blade support 32 of a blade 28*a-d* is an elongated, bent piece of rigid material. In an example, the blade support 32 is a metal such as austenitic stainless steel.

Each cutting member 28*a-d* in the group of cutting members 28*a-d* is, in an example, resiliently mounted in a blade receiving section 31 of the razor cartridge 20. The blade receiving section 31 comprises a longitudinal space in the razor cartridge 20 that is sized to accommodate the group of cutting members 28*a-d*. At least one cutting member 28*a* of the group of cutting members 28*a-d*, up to all cutting members in the group of cutting members 28*a-d* may be resiliently mounted in the blade receiving section 31. In the illustrated example of FIG. 2, the transverse inner sides of frame 21 comprise a plurality of holding slots 34. Each holding slot 34 on the transverse inner sides is configured to accept and retain an end of one side of a blade support 32 of a cutting member 28*a* of the group of cutting members 28*a-d* so that the cutting members 28*a-d* of the group of cutting members 28*a-d* are held in the blade receiving section 31 with a substantially parallel inter-blade span in the transverse direction (−x to x). Therefore, as many holding slots 34 are provided in each transverse inner side of frame 21 as there are blades.

Between the cutting member receiving section 31 and the handle (in a part adjacent to a handle 2 connection, for example) there are, in examples, provided one or more transverse frame members 35 that are integrally formed with the frame 21. The transverse frame members 35 comprises a plurality of cutting member guides 36*a-d* provided as a plurality of protuberances aligned with the holding slots 34*a-d* on the transverse inner sides of the frame 21. The cutting member guides 36*a-d* function to regulate the parallel inter-blade span.

Figure 3:
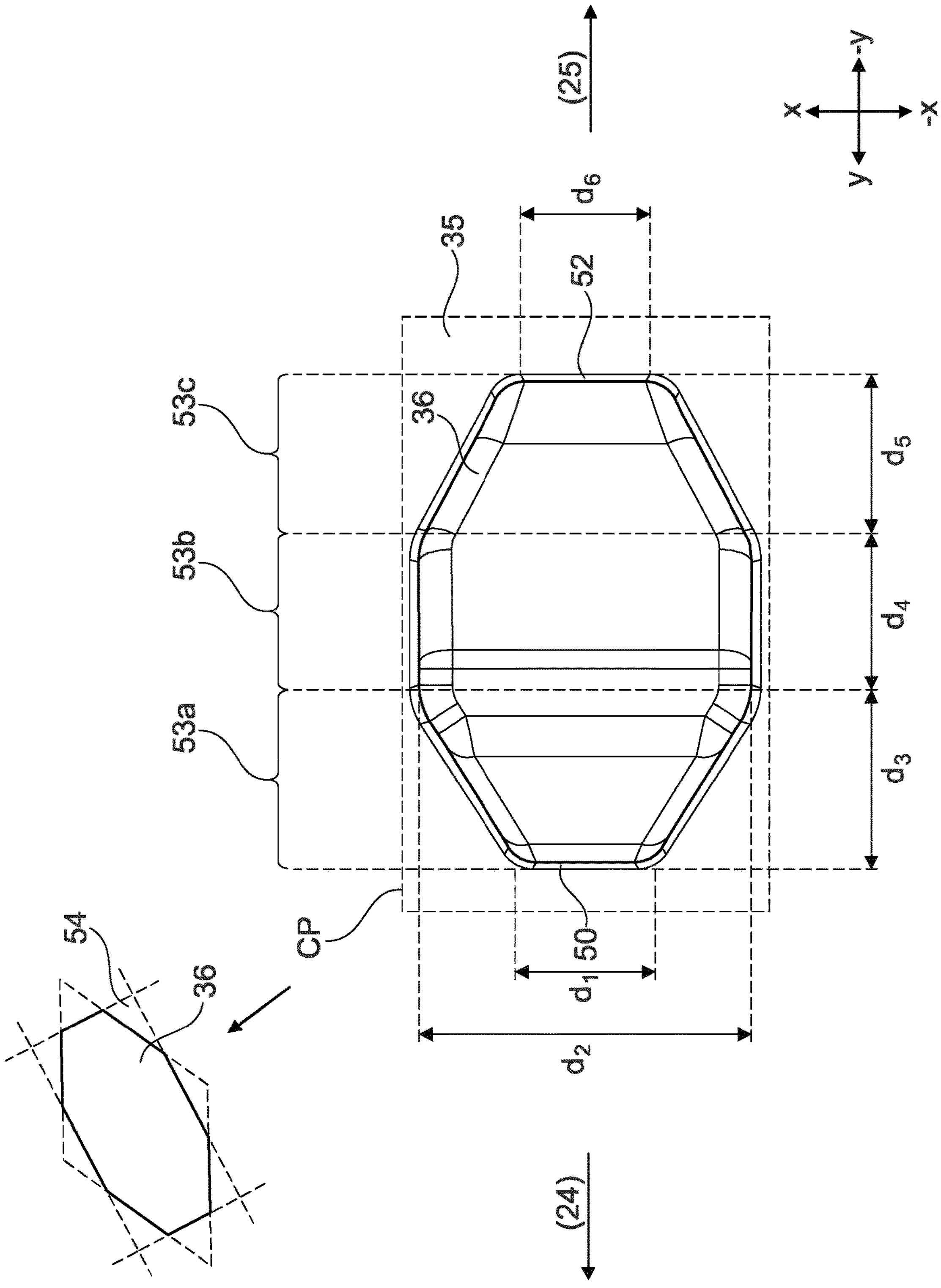
FIG. 3 is a schematic plan view of a cutting member guide of a razor cartridge.

FIG. 3 is a schematic plan view of a cutting member guide 36 of a razor cartridge 20 according to the first aspect. The cutting member guide 36 is provided on a portion of the transverse frame member 35 as a protrusion. For example, the cutting member guide 36 is provided as an injection-moulded protrusion of the transverse frame member 35. For example, the cutting member guide 36 is integrally formed with the transverse frame member 35. In an example, each cutting member guide 36 of the plurality of cutting member guides 36*a-d* is aligned on a common axis of the at least one transverse frame member. In another example, each cutting member guide of the plurality of cutting member guides is aligned on a central axis 58 of the at least one transverse frame member 35. In another example, at least one cutting member guide 36 is aligned away from a common axis or central axis 35 of the at least one transverse frame member 35.

The cutting member guide 36 illustrated in FIG. 3 has a complicated shape, and it will be appreciated by a skilled person that not all details of the shape illustrated in FIG. 3 are essential features.

The cutting member guide 36 is divided into a leading longitudinal portion 53*a*, an intermediate longitudinal portion 53*b*, and a trailing longitudinal portion 53*c*. The leading longitudinal portion 53*a* comprises a first planar face 50 running parallel to the direction of a longitudinal cutting member 28 (not shown in FIG. 3) when positioned in a cutting member support slot next to the first planar face 50 (not shown in FIG. 3). In an example of an assembled razor cartridge 20, the first planar face 50 of a first cutting member guide 36*a* makes an interference fit with a cutting member 28. The distance that the first planar face 50 of the cutting member guide 36 contacts the cutting member 28 (not shown in FIG. 3) is the first longitudinal distance $d^1$. In other words, the first longitudinal distance $d^1$ is defined by the width of the first planar face 50 of the at least one cutting member guide 36 in the cartridge plane CP. In FIG. 3, the cartridge plane CP is illustrated by the dotted line box.

The intermediate longitudinal portion 53*b* of the cutting member guide 36 has a wider extent across the cartridge plane CP compared to the first longitudinal distance d1. Therefore, a second longitudinal distance d2 is defined by the width of the intermediate longitudinal portion 53*b* in the cartridge plane CP.

In the example of FIG. 3, the leading longitudinal portion 53*a* approximates the form of a trapezoid, and the intermediate longitudinal portion 53*b* approximates the form of a rectangle. In the example of FIG. 3, the trailing longitudinal portion 53*c* also approximates the form of a trapezoid. In an embodiment, the transverse length of intermediate longitudinal portion 53*b* may be substantially zero, causing the plan form of the cutting member guide 36 on the cartridge plane CP to resemble an irregular hexagon or truncated diamond.

The total transverse length of the cutting member guide 36 illustrated in FIG. 3 is the sum of the transverse lengths (d3+d4+d5) of the leading longitudinal portion 53*a*, the intermediate longitudinal portion 53*b*, and the trailing longitudinal portion 53*c*. In an embodiment, the total transverse length (d3, d4, d5) of the at least one cutting member guide (36) is in the range of 0.30 mm to 1.00 mm.

According to the first aspect, the ratio of the first longitudinal distance d1 and the second longitudinal distance d2 is in the range 0.1:0.8. More specifically, the ratio is in the range 0.2:0.7. More specifically, the ratio is in the range 0.3:0.6. More specifically, the ratio is in the range 0.45:0.55.

In a specific example of a cutting member guide 36, the first longitudinal distance d1 is 0.35 mm, and the second longitudinal distance d2 is 1.0 mm, providing a ratio of 0.35. Furthermore, the leading longitudinal portion 53*a* has a length in the transverse direction (−y to y) of 0.60 mm. The intermediate longitudinal portion 53*b* has a length in the transverse direction (−y to y) of 0.48 mm. the trailing longitudinal portion 53*c* has a length in the transverse direction (−y to y) of 0.50 mm. A skilled person will realize that other dimensions may also be used without departing from the teaching of this specification.

The described trapezoidal shape of the leading longitudinal portion 53*a* and/or the trailing longitudinal portion 53*c* of the cutting member guide 36 enhances the strength of the cutting member guides which consequently ensures that the cutting members will be steadily held within the shaving head. This prevents or reduces cutting member deflection during shaving.

In other words, a leading longitudinal portion 53*a* and/or a trailing longitudinal portion 53*c* of the at least one cutting member guide 36 has the form of a trapezium in the cartridge plane CP.

In an embodiment, the cutting member guide 36 further comprises a second planar face 52 proximate to a second cutting member support slot and on the opposite side of the cutting member guide 36 to the side having the first planar face 50. A third longitudinal distance d6 is defined by the width of the second planar face 52 of the cutting member guide 36 in the cartridge plane CP.

A ratio of the third longitudinal distance d6 in the cartridge plane DP and the second longitudinal distance d2 in the cartridge plane CP is in the range 0.1:0.8.

According to an embodiment, the cutting member guide 36 has the form of a truncated rhombus in the cartridge plane CP. A truncated rhombus 54 is illustrated in FIG. 3 by a dotted line inset. An effect is that a cutting member guide 36 in the form of a truncated rhombus is stiffer, and can support a cutting member 28*a* in a razor cartridge 20 with a greater degree of stability. In embodiments where a plurality of cutting member guides 36 is provided, each cutting member guide 36 of the plurality of cutting member guides 36 has the form of a truncated rhombus in the cartridge plane CP. A skilled person will appreciate that not all of the cutting member guides 36 of a razor cartridge need to meet the condition for the beneficial effect to be achieved.

Figure 4:
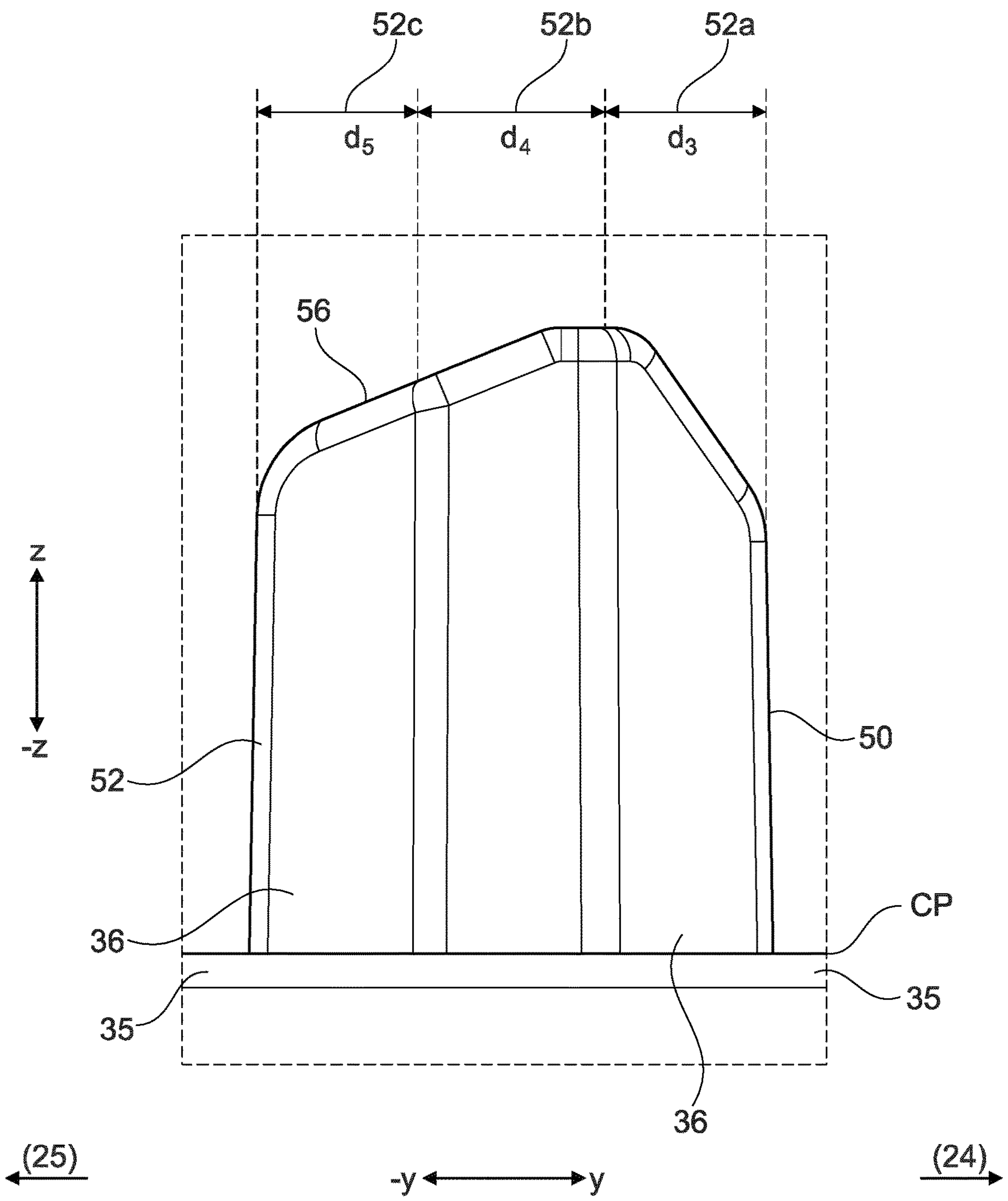
FIG. 4 is a schematic side view of a cutting member guide of a razor cartridge.

FIG. 4 is a schematic side view of the same cutting member guide 36 illustrated in FIG. 3. The cutting member guide 36 is an integral protuberance of a transverse frame member 35. The upper portion of the cutting member guide 36 has an arbitrary height and shape suitable for accommodating the transverse cross section of a cutting member. For example, in the case where the cutting members 28*a*-*d* comprise bent blades, the member guide 36 underlying the bent blade may have a curved profile.

Figure 5:
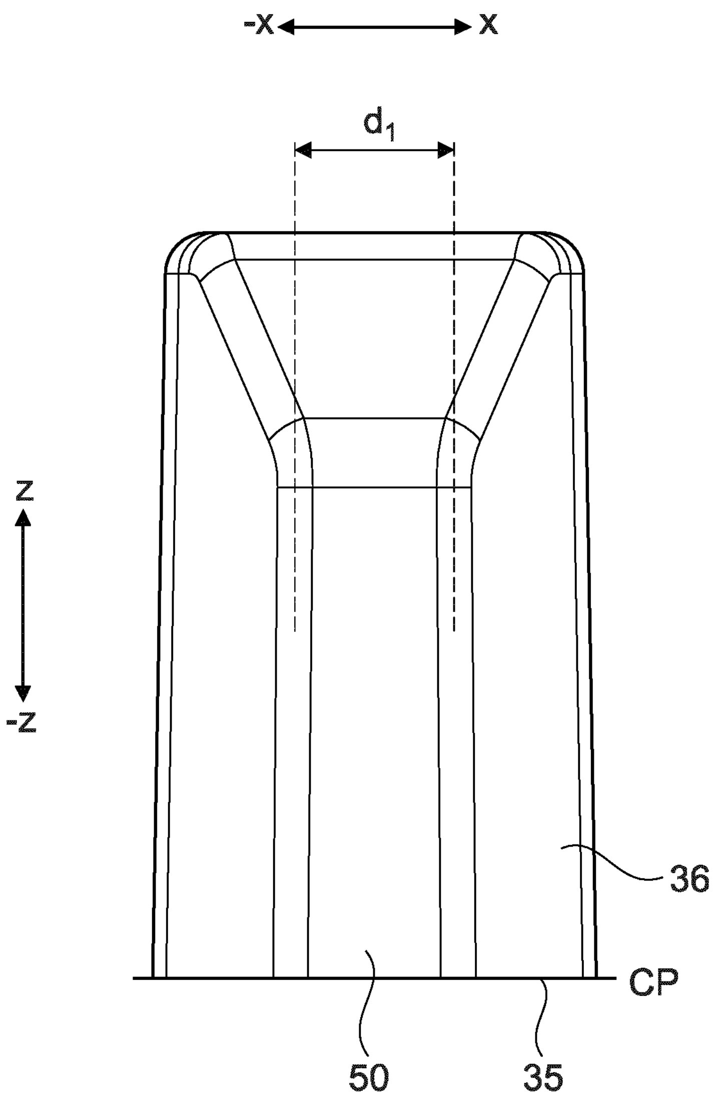
FIG. 5 is a schematic end view of a first end of a cutting member guide of a razor cartridge.
Figure 6:
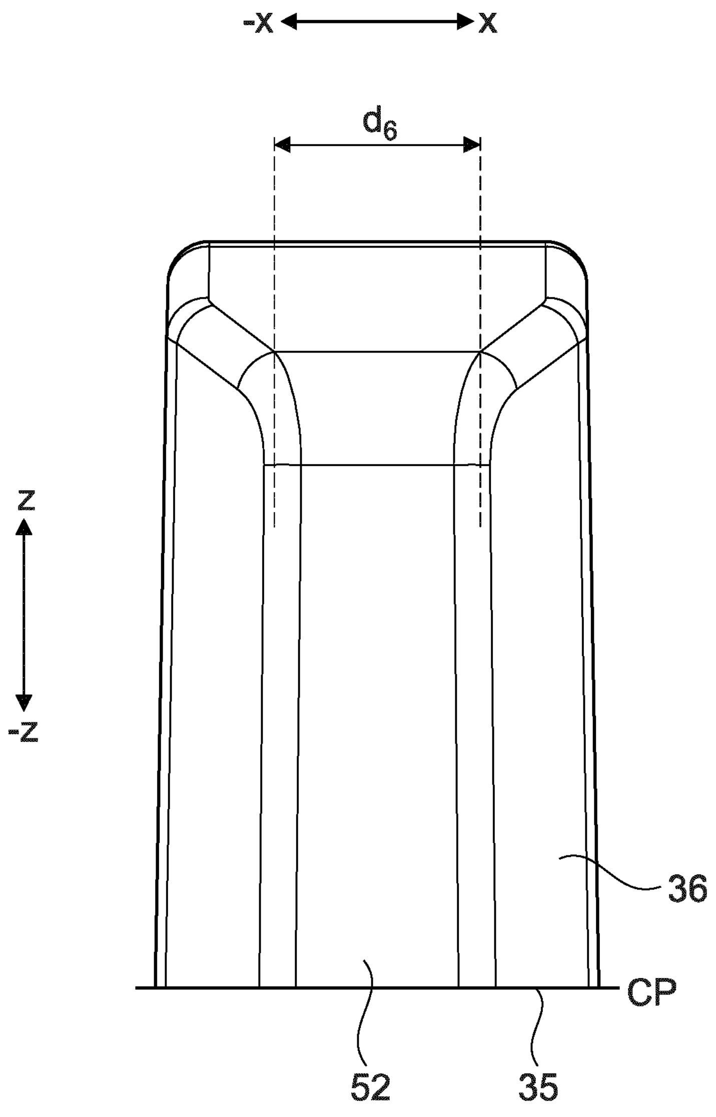
FIG. 6 is a schematic end view of a second end of a cutting member guide of a razor cartridge.

FIG. 5 is a schematic end view of a first end of the same cutting member guide 36 illustrated in FIG. 3 showing the first planar face 50. This FIG. 6 is a schematic end view of a second end of the same cutting member guide 36 illustrated in FIG. 3 showing the second planar face 52.

A skilled person will appreciate that a cutting member guide 36 in accordance with the first aspect may have many different shapes, provided the ratio of the first longitudinal distance d1 and the second longitudinal distance d2 (as described above) is in the range 0.1:0.8. Furthermore, where a plurality of cutting member guides 36 is provided, a subset of cutting member guides in a plurality of cutting member guides may have a different shape provided at least one cutting member guide 36 has a first longitudinal distance d1 and a second longitudinal distance d2 (as described above) having a ratio in the range 0.1:0.8.

Figure 7A:
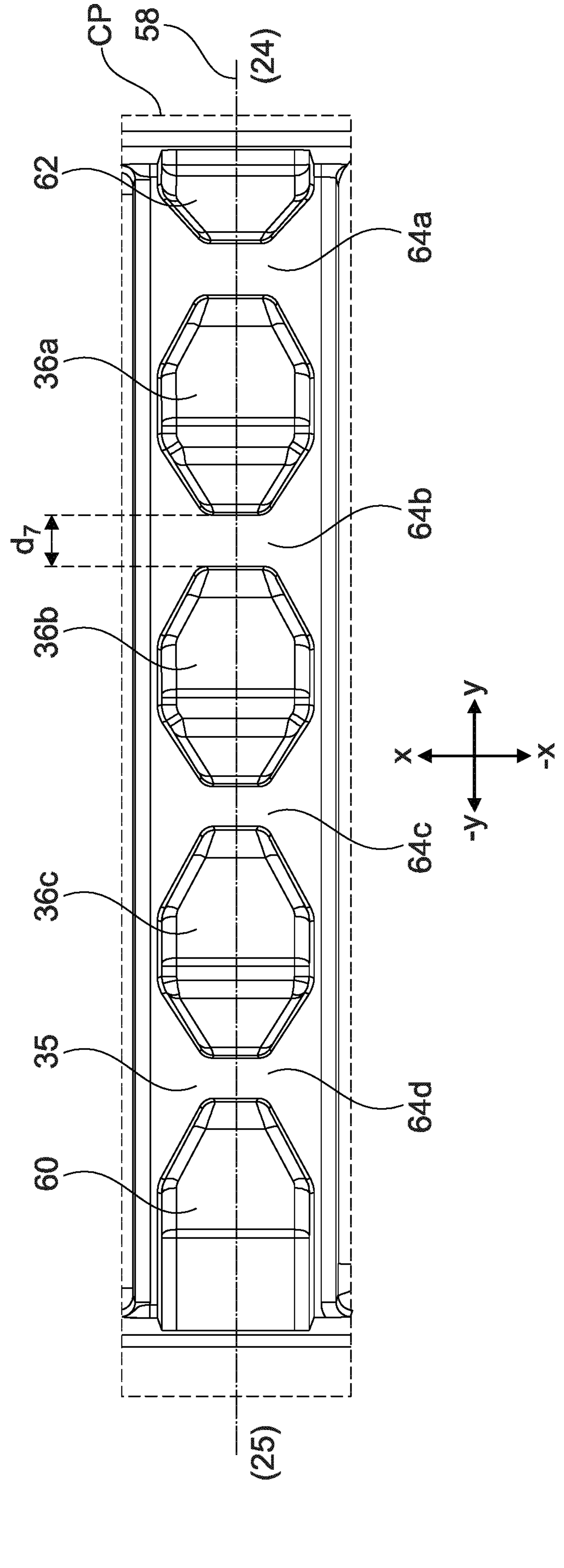
FIG. 7*a* is a schematic plan view of several cutting member guides arranged along a common centre line of a transverse frame member of a razor cartridge.

FIG. 7*a* is a schematic plan view of three cutting member guides 36 arranged along a common centre line 58 of a transverse frame member 35 of a razor cartridge 20. FIG. 7*a* illustrates a first 36*a* cutting member guide 36*a*, a second 36*b* cutting member guide 36*b*, and a third 36*c* cutting member guide 36*c*. In the embodiment of FIG. 7*a*, the first, second, and third cutting member guides have the same shape. However, a skilled person will appreciate that each cutting member guide of the plurality of cutting member guides 36 may have a different shape, provided one cutting member guide has a ratio of the first longitudinal distance d1 (of a first planar face 50) and the second longitudinal distance d2 is in the range 0.1:0.8.

FIG. 7*a* also demonstrates a leading end support 60 comprising a cutting member guide in the form of a trapezium in the cartridge plane CP, and a trailing end support 62 comprising a cutting member guide 36 in the form of a trapezium in the cartridge plane CP. Of course, the leading end support 60 and the trailing end support 62 may have different shapes. In common with the cutting member guides 36, the leading end support 60 and/or the trailing end support 62 comprise planar faces that contact a cutting member 36 (not shown in FIG. 7*a*). The leading end support 60 and the trailing end support 62 comprise a width greater than their respective planar faces at the portion where they respectively join the leading longitudinal member 24 or the trailing longitudinal member of the frame 21.

In an embodiment, the ratio of the width of the planar face of the leading end support 60 and the width of the portion of the leading end support 60 that contacts the leading longitudinal member 24 is also in the range 0.1:0.8.

In an embodiment, the ratio of the width of the planar face of the trailing end support 62 and the width of the portion of the trailing end support 62 that contacts the trailing longitudinal member 25 is in the range 0.1:0.8.

The razor cartridge 20 exemplified in FIG. 7*a* has a frame intended to hold four cutting members 28*a*-*d*, in a first cutting member support slot 64*a*, second cutting member support slot 64*b*, third cutting member support slot 64*c*, and fourth cutting member support slot 64*d*. The cutting member support slots are formed by the planar faces of two consecutive cutting member guides 36 and/or one cutting member guide 36 in combination with the leading end support 60 or the trailing end support 62.

In embodiments, the distance d7 in the transverse direction (−y to y) of the cartridge plane CP (transverse length) between the planar faces of two consecutive cutting member guides 36 and/or one cutting member guide 36 in combination with the leading end support 60 or the trailing end support 62 that form the cutting member support slots 64*a*-*d* is in the range 0.1 mm to 0.35 mm, and more specifically 0.15 mm to 0.3 mm.

Figure 7B:
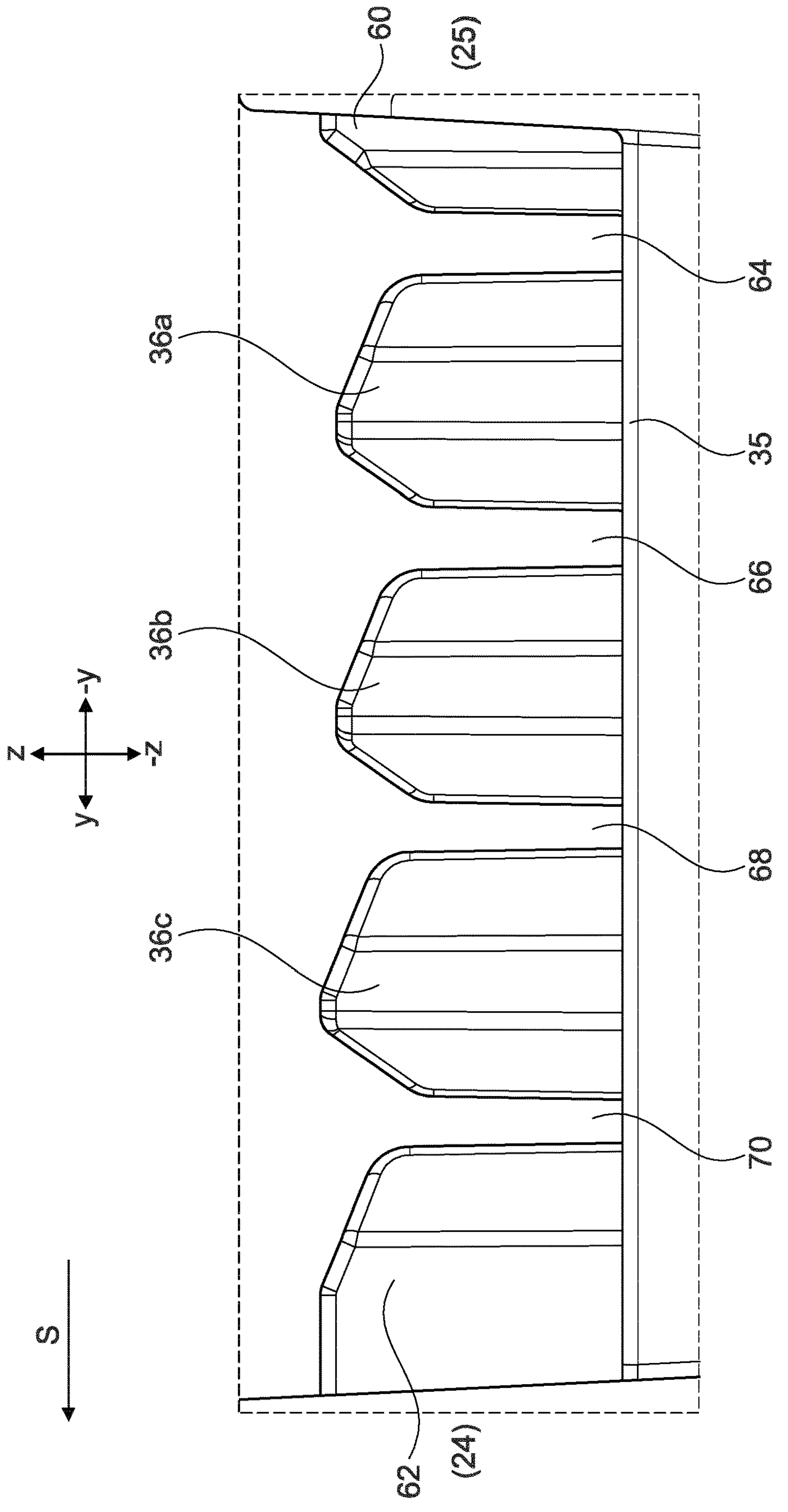
FIG. 7*b* is a schematic side view of several cutting member guides arranged along a common centre line of a transverse frame member of a razor cartridge.

FIG. 7*b* is a schematic side view of the first 36*a*, second 36*b*, third 36*c* cutting member guides 36 arranged along a common centre line of a transverse frame member 35 of a razor cartridge 20 illustrated in FIG. 7*a*.

Figure 8:
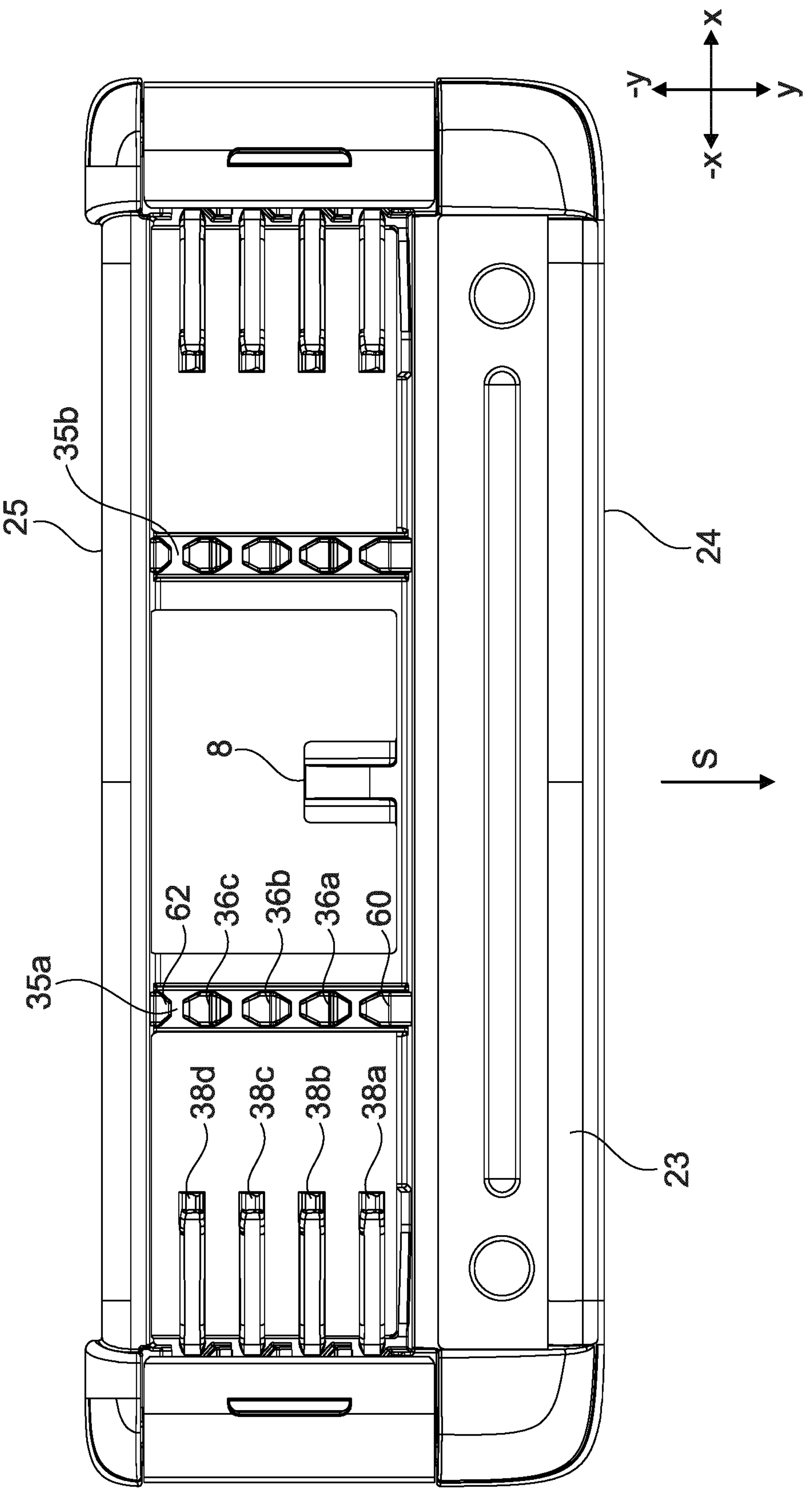
FIG. 8 is a schematic plan view of a razor cartridge frame member.

FIG. 8 is a schematic plan view of a frame 21 according to an embodiment with the cutting members and retainers omitted. In particular, a first 35*a* transverse frame member and a second 35*b* transverse frame member comprising cutting member guides 36 are shown. The first plurality of cutting member guides 36 is provided as three integral protuberances from a first transverse frame member 35*a*. The second plurality of cutting member guides 36 is provided as three integral protuberances from a second transverse frame member 35*b*. The first plurality of cutting member guides 36 and the second plurality of cutting member guides, respectively, centrally oriented on a central axis 58 on their respective transverse frame members 35*a* and 35*b*. However, in alternatives, the cutting member guides 36 could be provided at an offset from the central axes 58 of the respective transverse frame members 35*a* and 35*b*.

FIG. 8 illustrates an aspect of using cutting member guides 36 according to the first aspect. The improved strength and firmness of the cutting member guides 36 means that a razor cartridge 20 having a reduced number of transverse frame members 35 but a comparable cutting member stiffness can be provided. For example, a razor cartridge 20 having cutting member guides 36 on the transverse frame members 35 that are not in accordance with the first aspect provides less cutting member stiffness. Accordingly, three transverse frame members 35 may be required rather than two transverse frame members 35. This is of practical importance, because an increased number of transverse frame members 35 reduces the effectiveness of a water rinse of the razor cartridge 20 by blocking the passage of water through the razor cartridge 20.

In accordance with a razor cartridge 20 according to the first aspect, the special shape of the cutting member guides 36 disclosed herein enables the number of transverse frame members 35 to be reduced, whilst substantially maintaining stiffness of the cutting members 28*a-d* in use, improving the debris washing potential of a razor cartridge 20 in accordance with the first aspect.

Figure 9:
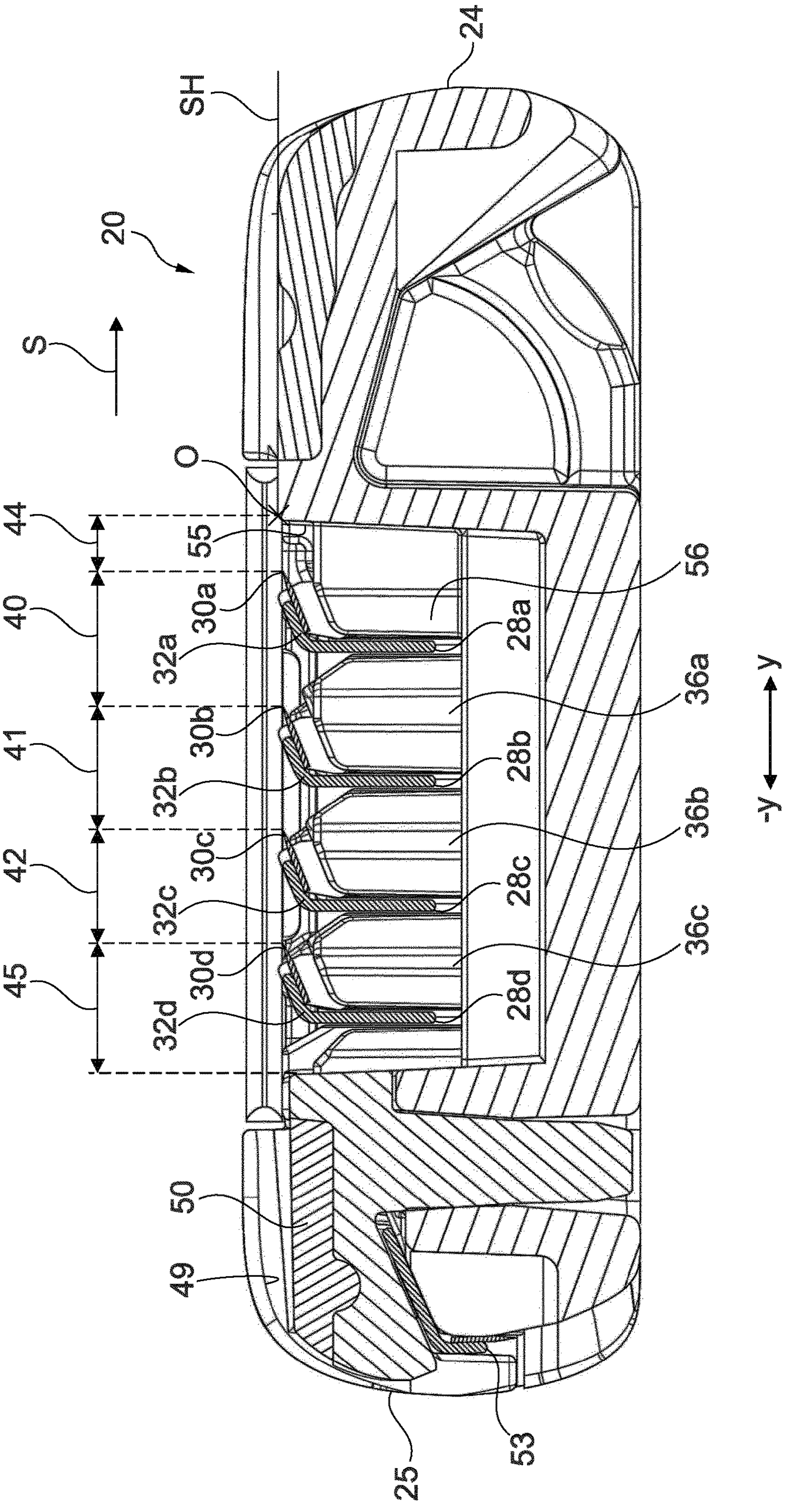
FIG. 9 is a schematic side view of an alternative razor cartridge showing the cutting members fitted in position.

FIG. 9 is a schematic side view of an alternative razor cartridge design in accordance with the first aspect showing the cutting members fitted in position.

FIG. 9 illustrates an alternative razor cartridge design in accordance with the first aspect comprising, for example, a longitudinal skincare element 50 held on an example longitudinal trailing assembly 49. In an example, the alternative razor cartridge comprises a trimming blade assembly 53. A skilled person will appreciate that the example longitudinal trailing assembly 49 may be omitted without loss of generality. FIG. 9 illustrates cutting members 28*a-d* comprising blade supports 32*a*-32*d* and their blades 33 positioned in-between the cutting member guides 36*a*-36*d*.

In embodiments, the razor cartridge 20 is designed to accommodate two, three, four, five, six, or more cutting members 28*a-d* comprising blade supports 32*a*-32*d* (and their blades).

In embodiments, the blade supports 32*a*-32*d* each comprise blades facing towards the shaving plane SH (not illustrated).

In embodiments, the blade supports 32*a*-32*d* each comprise blades facing away from the shaving plane SH. In other words, the blades may be mounted "underneath the blade support". The phrase "underneath the blade support" for the purposes of this specification means a side of a blade support of a razor cartridge that is furthest from a shaving plane SH (skin) of a user when the razor cartridge is in use, as illustrated in FIG. 9.

In embodiments, the blade guides 36*a*-36*d* are configured to support "bent blades" having a radiused portion in which the cutting edge is integral with (formed from the same piece of metal) as the blade support, as known to a skilled person. Blade guides 36*a*-36*d* configured to support "bent blades" may, for example, comprise a curved upper portion configured to support or accommodate the radius portion of the "bent blade"; for example.

A leading cutting member to frame span 44 is the transverse span (substantially aligned with the shaving direction S) that is perpendicular to the longitudinal orientation of the cutting member 28*a* of the group of cutting members 28*a-d* that spans the space between the internal leading longitudinal wall of the cutting member receiving section 55 that is closest to a shaving plane SH in use (the origin) and the cutting edge 30*d* of the leading cutting member of the group of cutting members 28*a-d*.

A leading inter-blade span 40 that is the closest inter-blade span to the leading longitudinal side 24 of the razor cartridge is a transverse span (substantially aligned with the shaving direction S in use) that is substantially perpendicular to the longitudinal orientation of the cutting members 28 of the group of cutting members 28*a-d*. The leading inter-blade span 40 begins at a point on cutting edge 30*a* and ends on to a corresponding point on the cutting edge 30*c* of the first intermediate blade 33*b*.

A first intermediate inter-blade span 41 is a transverse span (substantially aligned with the shaving direction S in use) that is substantially perpendicular to the longitudinal orientation of the cutting members of the group of cutting members 28*a-d*. The first intermediate inter-blade span 41 begins at a point on cutting edge 30*b* and ends on a corresponding point on the cutting edge 30*c* of the second intermediate blade 33*b*.

A trailing inter-blade span 42 is a transverse span (substantially aligned with the shaving direction S in use) that is perpendicular to the longitudinal orientation of the cutting members 28 of the group of cutting members 28*a-d*. The trailing inter-blade span 42 begins a point on cutting edge 30*c* and ends on a corresponding point on the cutting edge 30*d* of the blade 33*a* that is closest to the trailing longitudinal side 25 of the razor cartridge 20.

A trailing blade to frame span 45 that is a transverse span (substantially aligned with the shaving direction S in use) that is perpendicular to the longitudinal orientation of the cutting members of the group of cutting members 28*a-d* the cutting edge 30*a* and a corresponding point on the internal trailing longitudinal wall of cutting member receiving section 56.

Thus, the total span of the cutting member receiving section 31 corresponds to the sum of spans 44, 40, 41, 42, and 45. In practice, the total span of the cutting member receiving section may be in the range of 7 to 15 mm.

As will subsequently be discussed, each cutting member mounting portion 71 is disposed on an inner surface 66 of a respective blade support 32 that, in use, faces away from a shaving plane SH. The cutting edge 30 extends forward from the front of the blade support 32. However, the blade support 32 has a non-negligible thickness. For example, the blade support 32 has a thickness in the range 0.12 mm-0.21 mm, and more specifically in the range 0.155 mm-0.185, and most specifically 0.17 mm.

In an example, at least one blade support 32 of the group of cutting members 28*a-d* has a different thickness and/or tilt angle to the remainder of the blade supports 32.

A leading blade to frame span 44 is a transverse span (substantially aligned with the shaving direction S in use) that is perpendicular to the longitudinal orientation of the cutting members of the group of cutting members 28*a-d*. The leading blade to frame span 44 begins at a point on the internal leading longitudinal wall 55 that is, in an example, closest to the shaving plane SH The leading blade to frame span ends at a corresponding point on the cutting edge 30*a* of the blade 33*a* of the leading cutting member 28*a* that is in an example, closest to the shaving plane SH.

In an example the leading frame to blade span 44 is 0.5 mm to 0.9 mm, and specifically 0.7 mm A trailing blade to frame span 45 is a transverse span (substantially aligned with the shaving direction S in use) that is perpendicular to the longitudinal orientation of the cutting members of the group of cutting members 28*a-d*. The following blade to frame span begins at a point on the cutting edge 30*d* of the blade 33*d* of the trailing cutting member 28*a-d*. The trailing blade to frame span 45 ends at a corresponding point on the internal trailing longitudinal wall 57 that is, in an example, closest to the shaving plane SH.

In an example, the trailing frame to blade span 44 is 1.6 mm to 2.0 mm, and specifically 1.8 mm. In an example, the leading blade to frame span 44 is greater than the trailing blade to frame span 45. In an example, the leading blade to frame span 44 is smaller than the trailing blade to frame span 45. In an example, the leading blade to frame span 44 is substantially equal to than the trailing blade to frame span 45. In an example, the leading blade to frame span 44 is greater than the leading inter-blade span 40. In an example, the leading blade to frame span 44 is substantially equal to than the leading inter-blade span 40. In an example, the leading blade to frame span 44 is smaller than to the leading inter-blade span 40. In an example, the trailing blade to frame span 45 is greater than the trailing inter-blade span 42. In an example, the trailing blade to frame span 45 is substantially equal to the trailing inter-blade span 42. In an example, the trailing blade to frame span 45 is smaller than the trailing inter-blade span 42. In an example, the first intermediate inter-blade span 41 and the second intermediate inter-blade span 42 are each substantially equal to the leading inter-blade span 40. In an example, the first intermediate inter-blade span 41 and the second intermediate inter-blade span are each substantially equal to the trailing inter-blade span 42. In an example, the first intermediate inter-blade span 41 is less than the leading inter-blade span 41 and greater than the second intermediate inter-blade span.

In an example, the second intermediate inter-blade span is equal to the trailing inter-blade span 42. In an example, a leading inter-blade span that is closest to the leading longitudinal side of the razor cartridge is greater than a trailing inter-blade span that is closest to the trailing longitudinal side of the razor cartridge.

FIG. 9 also illustrates a debris run-off portion underneath the group of cutting members 28*a-d*. The width of the debris run-off portions is defined by the relative spacing of the cutting members of the group of cutting members 28*a-d*. An effect of variable inter blade spacing is that, in use, a greater amount of hair clippings and foam can be removed via the first (relatively wider) debris run-off portion. This reduces the risk of blockage of the debris run-off portions, particularly when the razor cartridge is used by infrequent shaver users, because the most troublesome debris can escape via the first (relatively wider) debris run-off portion.

The leading blade to frame span 44 may be larger than, equal to, or smaller than the leading inter-blade span 40. The trailing blade to frame span 45 may be larger than, equal to, or smaller than the trailing inter-blade span 42. In an example, the leading inter-blade span 40 is greater than the trailing inter-blade span 42. In an example, the first intermediate inter-blade span is equal to, or less than, the leading inter-blade span. In an example, the first intermediate inter-blade span is equal to, or greater than, the trailing inter-blade span.

Although a razor cartridge with four cutting members 28*a-d* has been illustrated, the present specification also includes a razor cartridge comprising three cutting members 28, or greater than four cutting members 28. For example, five substantially parallel cutting members 28 may be disposed in a shaving direction of the razor cartridge 20, wherein a second intermediate inter-blade span is defined adjacent to the trailing inter-blade span 42.

In an example, the first intermediate inter-blade span 41 and the second intermediate inter-blade span are each substantially equal to the leading inter-blade span. In an example, the first intermediate inter-blade span 41 and the second intermediate inter-blade span are each substantially equal to the trailing inter-blade span 42. In an example, the first intermediate inter-blade span is less than the leading inter-blade span 40 and greater than the second intermediate inter-blade span. In an example, the second intermediate inter-blade span is equal to the trailing inter-blade span 42.

In an example, consecutive inter-blade spans of the razor cartridge successively decrease between the leading longitudinal side 24 and the trailing longitudinal side 25 of the razor cartridge in the shaving direction.

In an example, each of the supports 32*a-d* comprises a shaving plane contact portion 58 that is configured, in use, to contact the shaving plane SH in addition to the cutting edges 30 of the blades, thereby reducing the pressure at each cutting edge contact point with the shaving plane. The pressure at the cutting edge contact points may therefore be reduced.

Figure 10:
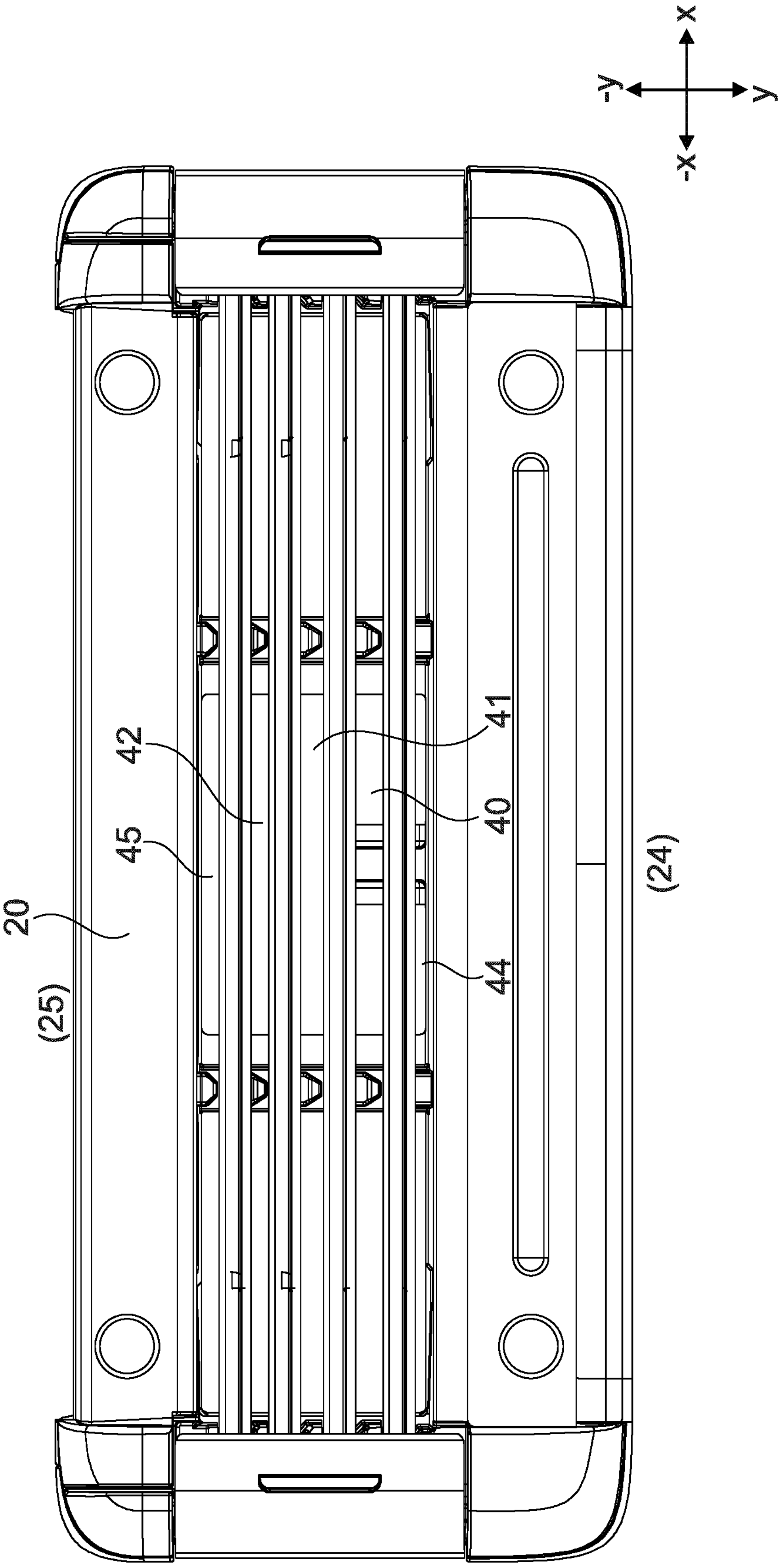
FIG. 10 is a schematic plan view of a further alternative razor cartridge having variable inter-blade spacing.
Figure 11:
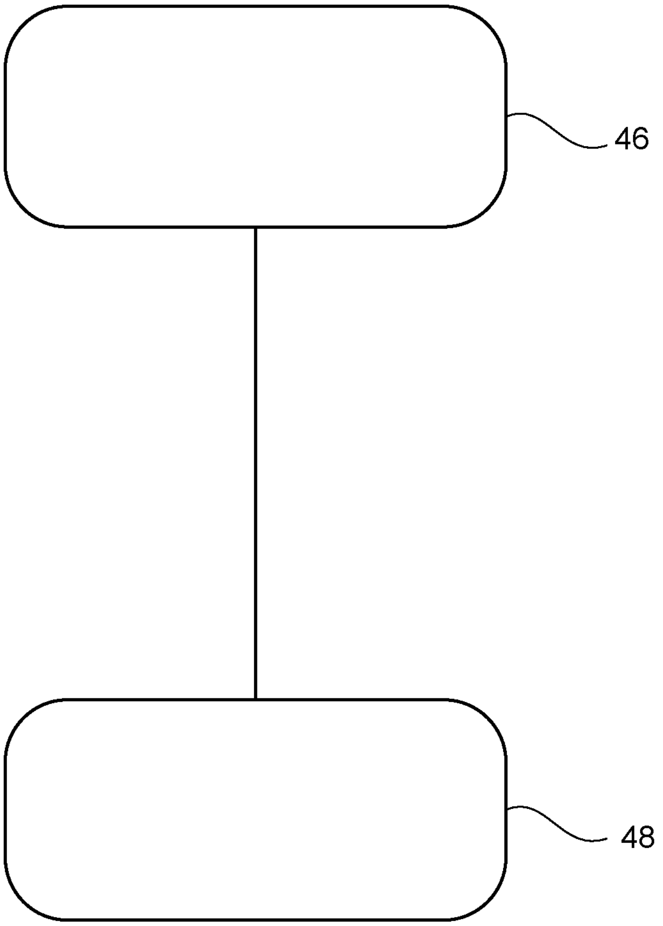
FIG. 11 schematically illustrates a method for manufacturing a razor cartridge.

FIG. 10 is a schematic plan view of the alternative razor cartridge 20 having variable inter-blade spacing.

A razor cartridge 20 according to the first aspect, in embodiments, have a variable inter-blade span IBS.

Therefore, in one variant, the spacing of the cutting members is progressively decreased between the leading longitudinal side 24 and the trailing longitudinal side 25 of the razor 20 to generate the variable inter-blade span IBS. This provides for a relatively large inter-blade space towards the leading longitudinal side 24 of the razor cartridge 20, enabling a wider path for thick debris (cut hairs) to escape. A relatively smaller inter-blade space is provided towards the trailing longitudinal side 25 of the razor cartridge 20, enabling a thinner inter-blade spacing that supports the skin more effectively.

Alternatively, the spacing of the cutting members 28*a-d* can be progressively increased between the leading longitudinal side 24 and the trailing longitudinal side 25.

In either case of providing a variable inter-blade spacing with a progressively increasing or decreasing inter-blade spacing between the leading longitudinal side 24 and the trailing longitudinal side 25, variations in the dimensions and/or spacing of the blade guides 36*a-d* are needed to generate the variable inter-blade spacing.

According to one embodiment, variable inter-blade spacing is generated by progressively adjusting the dimensions of the cutting member guides 36*a*-36*d* between the leading longitudinal member 24 and the trailing longitudinal member 25.

For example, turning back to FIG. 3, a first cutting member guide 36*a* and a second cutting member guide 36*b* are provided on a common transverse frame member 35. The first cutting member guide 36*a* is closer to the leading longitudinal member 24 than the second cutting member guide 36*b*.

The trailing longitudinal portion 52*c* of the first cutting member guide 36*a* and/or the intermediate longitudinal portion 52*b* of the first cutting member guide 36 are dimensioned to be longer in the transverse direction than the trailing longitudinal portion 52*c* of the second cutting member guide 36*a* and/or the intermediate longitudinal portion 52*b* of the second cutting member guide 36. Many different transverse dimensions of intermediate and trailing longitudinal portions may be selected, provided the dimensions of the cutting member guides 64 are sufficient to hold the cutting members in place and generate variable inter-blade spacing.

According to a second aspect, there is provided a method for manufacturing a razor cartridge comprising:

a) providing 46 a frame comprising a leading longitudinal member and a trailing longitudinal member, and at least one transverse frame member defining a cartridge plane disposed in between, and joining, the leading longitudinal member and the trailing longitudinal member in a transverse direction of the razor cartridge, wherein the at least one transverse frame member comprises a plurality of cutting member guides defining a plurality of cutting member support slots each configured to accommodate a longitudinal cutting member;

wherein at least one cutting member guide comprises a first planar face 50 proximate to a first cutting member support slot, and wherein the at least one cutting member guide further comprises an intermediate portion that is a greater distance away from the first cutting member support slot than the first planar face 50 in the transverse direction of the razor cartridge, and wherein a first longitudinal distance is defined by the width of the first planar face (50) of the at least one cutting member guide in the cartridge plane, and a second longitudinal distance is defined by width of the intermediate portion of the first cutting member guide at the widest point of the first blade guide in the cartridge plane, wherein a ratio of the first longitudinal distance and the second longitudinal distance is in the range 0.1:0.8; and b) providing 48 a plurality of longitudinal cutting members, wherein each cutting member support is disposed in a respective cutting member support slot of the at least one transverse frame member.

According to a third aspect, there is provided a razor handle 2;

a razor cartridge 20 according to the first aspect or its embodiments, wherein the razor cartridge is either releasably attached to the razor handle, integrally formed with the razor handle via a non-pivotable connection, or integrally formed with the razor handle via a pivotable connection.

According to fourth aspect there is provided a kit of parts comprising a razor cartridge holder comprising a plurality of razor cartridges 20 according to the first aspect or its embodiments, and optionally a razor handle 2.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

REFERENCE NUMERALS

| | |
|---|---|
| H | Handle direction |
| S | Shaving direction |
| SH | Shaving plane |
| L | Longitudinal direction |
| IBS | inter blade span |
| RO | inner radius of curvature |
| T1 | Razor blade thickness |
| T2 | Blade support thickness |
| CP | cartridge plane |
| 1 | Shaving razor assembly |
| 2 | Handle |
| 4 | proximal portions |
| 5a, 5b | release mechanism |
| 6 | distal portion |
| 7 | thumb rest |
| 8 | pivotable bearing member |
| 9 | handle grips |
| 12 | bulging |
| 14 | skin contact point |
| 16 | first side portion |
| 18 | second side portion |
| 20 | razor cartridge |
| 21 | frame |
| 22 | platform member |
| 23 | guard member |
| 24 | leading longitudinal member |
| 25 | trailing longitudinal member |
| 26 | first retainer |
| 27 | second retainer |
| 28a-d | cutting member |
| 30a-d | cutting edge |
| 31 | cutting member receiving section |
| 32 | blade support |
| 33a-d | blade |
| 34a-d | holding slots |
| 35 | transverse frame member |
| 36 | cutting member guide |
| 38a-d | resilient finger |
| 40 | leading inter blade span |
| 41 | first intermediate inter blade span |
| 42 | trailing inter-blade span |
| 43a-d | cutting edge to blade span |
| 44 | leading blade to frame span |
| 45 | trailing blade to frame span |
| 46 | providing a frame . . . |
| 48 | providing a plurality of cutting members . . . |
| 49 | longitudinal trailing assembly |
| 50 | first planar face |
| 52 | second planar face |
| 53a | leading portion of guide |
| 53b | intermediate portion of guide |
| 53c | trailing portion of guide |
| 54 | truncated rhombus |
| 55 | leading longitudinal wall |
| 56 | cutting member receiving section |
| 58 | common centre line |
| 60 | leading end support |
| 62 | trailing end support |
| 64a-d | cutting member support slots |
| 66 | first plurality of blade guides |
| 68 | second plurality of blade guides |

The invention claimed is:

1. A razor cartridge comprising:

a frame, wherein the frame comprises a leading longitudinal member and a trailing longitudinal member, and at least one transverse frame member defining a cartridge plane, disposed in between, and joining, the leading longitudinal member and the trailing longitudinal member, in a transverse direction of the razor cartridge;

wherein the at least one transverse frame member comprises a plurality of cutting member guides defining a plurality of cutting member support slots, each cutting member support slot configured to accommodate a longitudinal cutting member; and a plurality of longitudinal cutting members, wherein each cutting member is disposed in a respective cutting member support slot;

wherein at least one cutting member guide comprises a first planar face proximate to a first cutting member support slot, and wherein the at least one cutting member guide further comprises an intermediate portion that is a greater distance away from the first cutting member support slot than the first planar face in the transverse direction of the razor cartridge;

wherein a first longitudinal distance is defined by a width of the first planar face of the at least one cutting member guide in the cartridge plane, and a second longitudinal distance parallel to the first longitudinal distance is defined by a width of the intermediate portion of the at least one cutting member guide at the widest point of the at least one cutting member guide in the cartridge plane;

wherein a ratio of the first longitudinal distance and the second longitudinal distance is in the range 0.1:0.8; and wherein the plurality of cutting member guides include a leading end support that comprises a leading planar face proximate to a leading cutting member support slot, and wherein the leading end support contacts the leading longitudinal member at the widest point of the leading end support.

2. The razor cartridge according to claim 1, wherein each cutting member guide of the plurality of cutting member guides is aligned on a common axis of the at least one transverse frame member.

3. The razor cartridge according to claim 1, wherein a portion of the at least one cutting member guide has the form of a trapezium in the cartridge plane.

4. The razor cartridge according to claim 1, wherein the at least one cutting member guide further comprises a second planar face proximate to a second cutting member support slot and on the opposite side of the at least one cutting member guide to the first planar face, wherein a third longitudinal distance is defined by the width of the second planar face of the at least one cutting member guide in the cartridge plane; and wherein a ratio of the third longitudinal distance and the second longitudinal distance is in the range 0.1:0.8.

5. The razor cartridge according to claim 1, wherein the at least one cutting member guide has the form of a truncated rhombus in the cartridge plane.

6. The razor cartridge according to claim 5, wherein each cutting member guide of the plurality of cutting member guides has the form of a truncated rhombus in the cartridge plane.

7. The razor cartridge according to claim 1, wherein the at least one cutting member guide is provided as an integrally formed protuberance of the at least one transverse frame member.

8. The razor cartridge according to claim 1, further comprising:

a second cutting member guide spaced apart from the at least one cutting member guide on the at least one transverse frame member;

wherein the first cutting member support slot has a transverse length of the at least one transverse frame member bounded by the first planar face of the at least one cutting member guide, and a second planar face of the second cutting member guide.

9. The razor cartridge according to claim 8, wherein the transverse length of the first cutting member support slot is between 0.10 mm and 0.35 mm.

10. The razor cartridge according to claim 8, wherein a total transverse length of the at least one cutting member guide is different to the total transverse length of the second cutting member guide in the direction of the at least one transverse frame member.

11. The razor cartridge according to claim 10, wherein each cutting member guide of the plurality of cutting member guides has a successively increasing or decreasing total transverse length in the direction of the at least one transverse frame member to thereby provide a plurality of cutting members having an increasing or decreasing inter-blade span.

12. The razor cartridge according to claim 1, wherein each cutting member guide of the plurality of cutting member guides is uniformly spaced apart from a consecutive cutting member guide on the transverse frame member.

13. The razor cartridge according to claim 1, wherein the ratio of the first longitudinal distance and the second longitudinal distance is in the range 0.2:0.7.

14. A shaving razor assembly comprising:

a razor handle;

a razor cartridge according to claim 1, wherein the razor cartridge is either releasably attached to the razor handle or integrally formed with the razor handle via a non-pivotable connection, or integrally formed with the razor handle via a pivotable connection.

15. A kit of parts comprising:

a razor cartridge holder comprising a plurality of razor cartridges according to claim 1, and a razor handle.

16. The razor cartridge according to claim 1, wherein at least one of the plurality of longitudinal cutting members comprise a blade support comprising a mounting portion disposed on an inner surface of the blade support that in use faces away from a shaving plane.

17. The razor cartridge according to claim 16, wherein the blade support has a thickness in the range 0.12 mm-0.21 mm.

18. The razor cartridge according to claim 16, wherein at least one blade support of the group of cutting members has a different thickness and/or tilt angle to the remainder of the blade supports.

* * * * *